US012371305B2

(12) United States Patent
Kashiwakura

(10) Patent No.: US 12,371,305 B2
(45) Date of Patent: Jul. 29, 2025

(54) OPERATION SETTING DEVICE FOR ELEVATOR DOOR DEVICE, AND METHOD FOR SETTING OPENING AND CLOSING OPERATION OF THE DOOR DEVICE USING THE OPERATION SETTING DEVICE

(71) Applicant: FUJITEC CO., LTD., Hikone (JP)

(72) Inventor: Hiroshi Kashiwakura, Hikone (JP)

(73) Assignee: FUJITEC CO., LTD., Hikone (JP)

( * ) Notice: Subject to any disclaimer, the term of this patent is extended or adjusted under 35 U.S.C. 154(b) by 1161 days.

(21) Appl. No.: 17/213,511

(22) Filed: Mar. 26, 2021

(65) Prior Publication Data

US 2021/0300726 A1 Sep. 30, 2021

(30) Foreign Application Priority Data

Mar. 27, 2020 (JP) ................................ 2020-058331

(51) Int. Cl.
*B66B 13/14* (2006.01)
*B66B 19/00* (2006.01)

(52) U.S. Cl.
CPC .......... *B66B 13/146* (2013.01); *B66B 19/007* (2013.01)

(58) Field of Classification Search
CPC ............................ B66B 13/126; B66B 19/007
USPC .......................................................... 187/247
See application file for complete search history.

(56) References Cited

U.S. PATENT DOCUMENTS

| | | | | |
|---|---|---|---|---|
| 5,797,471 | A * | 8/1998 | Princell .................. | B66B 13/08 187/324 |
| 5,864,104 | A | 1/1999 | Tawada et al. | |
| 10,457,732 | B2 | 10/2019 | Kasturirangan et al. | |
| 2006/0191749 | A1* | 8/2006 | Sasaki .................. | B66B 13/301 187/391 |

FOREIGN PATENT DOCUMENTS

| | | | |
|---|---|---|---|
| EP | 1544152 | A1 | 6/2005 |
| JP | H7117960 | A | 5/1995 |
| JP | H8259154 | A | 10/1996 |
| JP | H1017250 | A | 1/1998 |
| JP | 2001231281 | A | 8/2001 |
| JP | 2002302369 | A | 10/2002 |
| JP | 2003341963 | A | 12/2003 |
| JP | 2007254035 | A | 10/2007 |
| JP | 2009292548 | A | 12/2009 |
| WO | 2004028951 | A1 | 4/2004 |

* cited by examiner

*Primary Examiner* — Erick D Glass
(74) *Attorney, Agent, or Firm* — The Webb Law Firm

(57) ABSTRACT

Provided is an operation setting device for an elevator door device, which includes: a door type selection part that selects opening types of a car door; a speed index selection part that selects an index of an opening and closing speed set for the car door; and a processing part that executes setting processing of deriving operation setting information representative of a setting content related to an opening and closing operation of the door device, and outputting the operation setting information to a controller that controls the opening and closing operation of the door device. The processing part includes a speed pattern deriving part that derives speed pattern information on the basis of the opening type selected by the door type selection part and the index of the opening and closing speed selected by the speed index selection part, in which the speed pattern information is the operation setting information.

8 Claims, 8 Drawing Sheets

Fig.7

| SELECTED INDEX INFORMATION / SELECTED PATTERN INFORMATION | HIGH SPEED | MEDIUM SPEED | LOW SPEED |
|---|---|---|---|
| 2CO | | | |
| 2SL | | | |
| 2SR | | | |
| 1SL | | | |
| 1SR | | | |

OPERATION SETTING DEVICE FOR ELEVATOR DOOR DEVICE, AND METHOD FOR SETTING OPENING AND CLOSING OPERATION OF THE DOOR DEVICE USING THE OPERATION SETTING DEVICE

CROSS-REFERENCE TO RELATED APPLICATION

This application claims priority to Japanese Patent Application No. 2020-058331 filed Mar. 27, 2020, the disclosure of which is incorporated herein by reference in its entirety.

BACKGROUND OF THE INVENTION

Field of the Invention

The present invention relates to an operation setting device for an elevator door device that is configured to set an opening and closing operation of the elevator door device, and a method for setting an opening and closing operation of an elevator door device using the operation setting device.

Description of Related Art

Conventionally, the opening and closing operation of the elevator door device is set by various methods, and, for example, there is known an elevator that has a function of setting the opening and closing operation as disclosed in JP 2009-292548 A.

The aforementioned elevator includes a door opening and closing controller that is arranged on a car and controls the opening and closing operation of the door, and further includes, inside the car, opening and closing buttons, destination buttons, and an in-car operation panel that includes a display device.

Speed patterns as the information representing the moving speeds of the car door at each of time during the opening and closing operation of the door are set in the door opening and closing device. The movement of the car door is controlled on the basis of the speed patterns.

The in-car operation panel includes a switch for switching a maintenance mode that enables switching into a mode (maintenance mode), in which a speed pattern can be set on the door opening and controller using the door opening and closing buttons or the destination buttons. When switching into the maintenance mode has been made by the in-car operation panel, a desirable speed pattern can be selected from among a plurality of speed patterns by pressing the door opening and closing buttons, and the selected speed pattern can be adjusted by pressing the destination buttons. An operator performs an operation of adjusting the speed pattern, which has been selected by the opening and closing buttons, by the destination buttons, and thereafter transmitting the adjusted speed pattern to the door opening and closing controller.

The operations such as selecting, from among the plurality of speed patterns, a speed pattern to be set on the door device or adjusting the speed pattern in setting the opening and closing operation on the door device are performed on the basis of the conditions, such as demands required for the opening and closing operation, the specifications of the door device, or the like.

However, the operator makes a judgement by his or her feelings on whether or not the speed pattern satisfies the aforementioned conditions, which sometimes causes variations in setting the opening and closing operation on the door device and hence time-consuming setting operation even if the conditions remain unchanged for every setting of the opening and closing operation on the door device.

SUMMARY OF THE INVENTION

In view of such circumstances, it is therefore an object of the present disclosure to provide an operation setting device for an elevator door device that is capable of securing consistency in setting contents on the opening and closing operation of the elevator door device, and a method for setting an opening and closing operation on the door device using the operation setting device.

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The operation setting device for an elevator door device of the present invention is an operation setting device for an elevator door device, the operation setting device being configured to be temporarily connected to a controller for controlling the elevator door device, and including: a door type selection part in which a plurality of opening types of a car door are set, the door type selection part being configured to enable selection of a desired type from among the plurality of opening types of the car door; a speed index selection part in which a plurality of indexes respectively representative of different opening and closing speeds to be set for the car door are set, the speed index selection part being configured to enable selection of a desired index from among the plurality of indexes; and a processing part being configured to execute setting processing on the basis of the opening type selected by the door type selection part and the index of the opening and closing speed selected by the speed index selection part, the setting processing including deriving operation setting information representative of a setting content related to an opening and closing operation of the door device, and outputting the operation setting information to the controller that controls the opening and closing operation of the door device, the processing part including a speed pattern deriving part that derives speed pattern information in the setting processing on the basis of the opening type selected by the door type selection part and the index of the opening and closing speed selected by the speed index selection part, in which the speed pattern information is the operation setting information and represents the speed of the car door at each of time during the opening and closing operation of the door device.

The operation setting device for the elevator door device may be configured such that the processing part includes a speed pattern adjustment part that, in the setting processing, acquires entrance width information representative of a width of an entrance of the car, and adjusts the speed pattern information derived by the speed pattern deriving part on the basis of the entrance width information to create adjusted pattern information.

The operating setting device for the elevator door device of the present invention may be configured such that the processing part includes a torque regulation part that derives, in the setting processing, torque regulation information that regulates a torque that can be produced by a motor serving as a power source of the car door, the torque regulation part being configured to acquire torque value information representative of a torque value of the motor, and allocating a torque value, which is higher than the torque value represented by the torque value information, as the torque regulation information.

The method for setting opening and closing operation of a door device using an operation setting device of the present invention is a method for setting an opening and closing operation of a door device in a state in which any of the aforementioned operation setting devices for the elevator door device is temporarily connected to the controller, the method including a setting processing execution step of allowing an operator to select the opening type corresponding to the car door of the door device as an object, in which the opening and closing operation is set, using the door type selection part, and to select the index of the opening and closing speed, which serves as a target of the moving speed of the car door of the door device as the object, in which the opening and closing operation is set, using the speed index selection part, and thereafter causing the processing part to execute the setting processing.

Effects of the Invention

As described above, according to the operation setting device for the elevator door device and the method for setting the opening and closing operation of the door device using the operation setting device, of the present disclosure, it is possible to produce an excellent effect of securing consistency in the setting content related to the opening and closing operation of the elevator door device.

BRIEF DESCRIPTION OF DRAWINGS

FIG. 7 is an explanatory diagram showing a data configuration of opening and closing type information, opening and closing speed information, and speed pattern information, of the operation setting device for the elevator door device according to the one embodiment.

DESCRIPTION OF THE INVENTION

Figure 1:
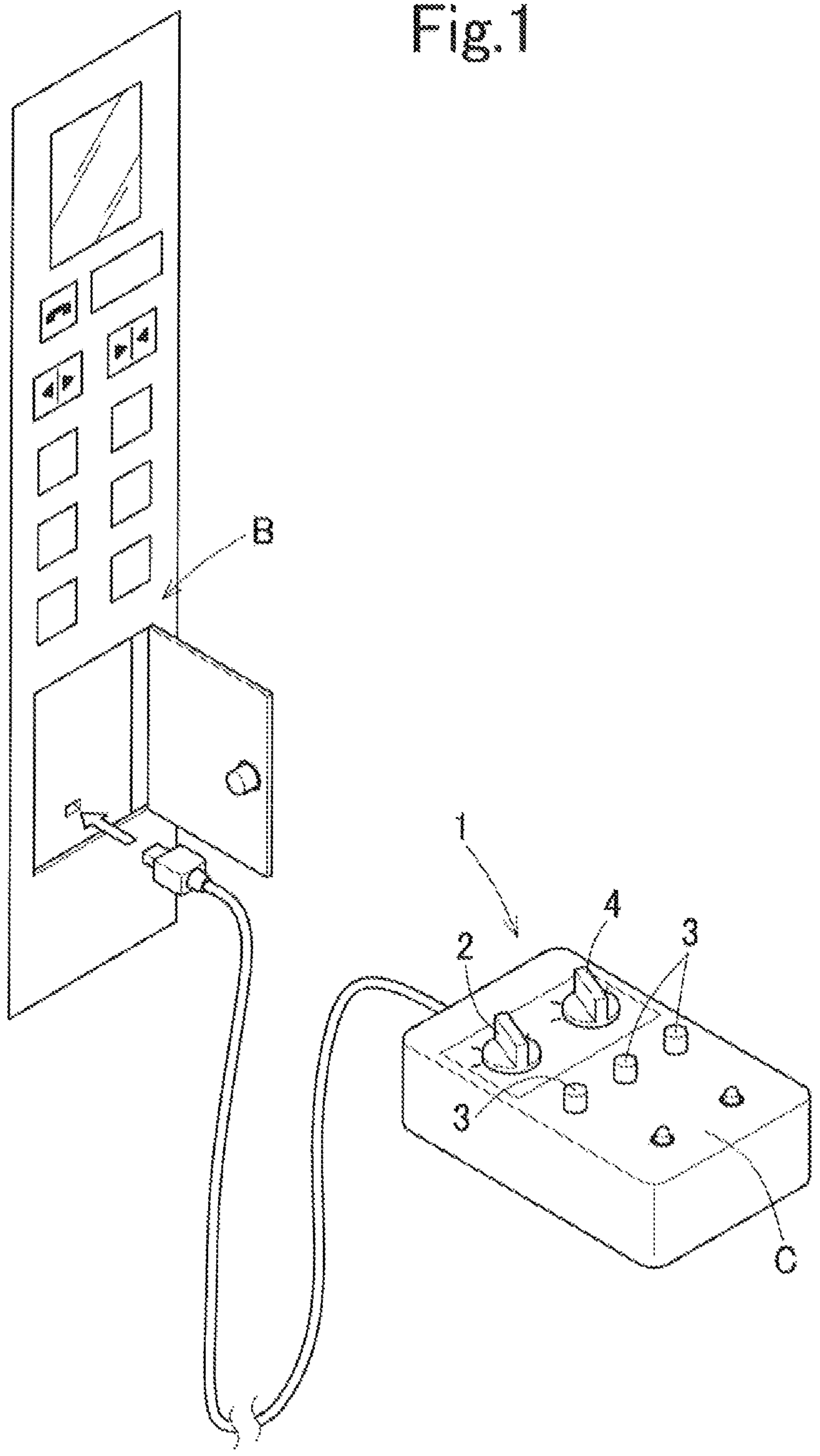
FIG. 1 is an outer appearance of an operation setting device for an elevator door device according to one embodiment of the present invention.

Hereinafter, an operation setting device for an elevator door device (hereinafter referred to as an operation setting device) according to one embodiment of the present invention will be described with reference to the attached drawings. As shown in FIG. 1, an operation setting device 1 of this embodiment is a portable device, examples of which include a notebook personal computer, and a portable type information terminal device such as a tablet computer, which are installed with a program configured to execute the same process as that of the portable device.

Figure 2:
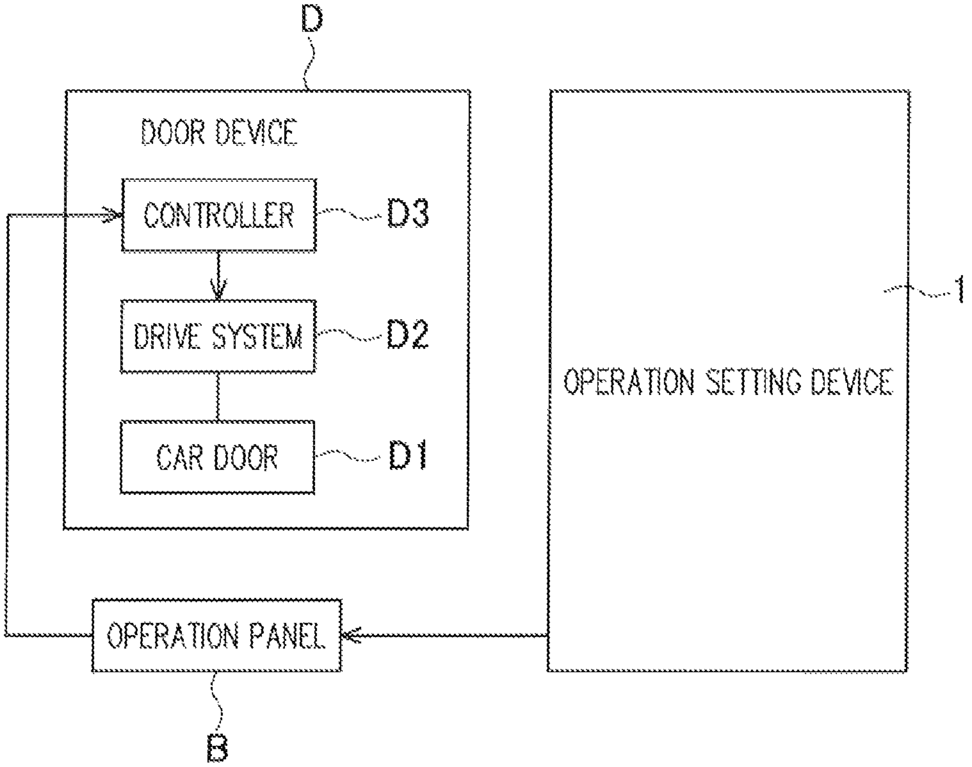
FIG. 2 is a block diagram showing the operation setting device for the elevator door device according to the one embodiment, and an outline of the door device.

As shown in FIG. 2, a door device D includes a car door D1, a drive system D2 for driving the car door D1, and a controller D3 for controlling the drive system D2.

The drive system D2 includes a motor as a power source for driving (i.e., sliding) the car door D1. The controller D3 includes operation setting information that represents a setting content related to the opening and closing operation of the door device D. The controller D3 is configured to be able to control the opening and closing operation of the door device D by controlling the operation of the motor.

The operation setting device of this embodiment is configured to be temporarily connected to the controller D3 to output the operation setting information to or write the same on the controller D3 to thereby set the opening and closing operation of the door device D.

The opening and closing operation of the door device D herein means, for example, an opening operation of opening the car door D1, a closing operation of closing the car door D1, and a stopping operation of stopping the movement of the car door D1 during the opening operation or the closing operation.

Figure 3:
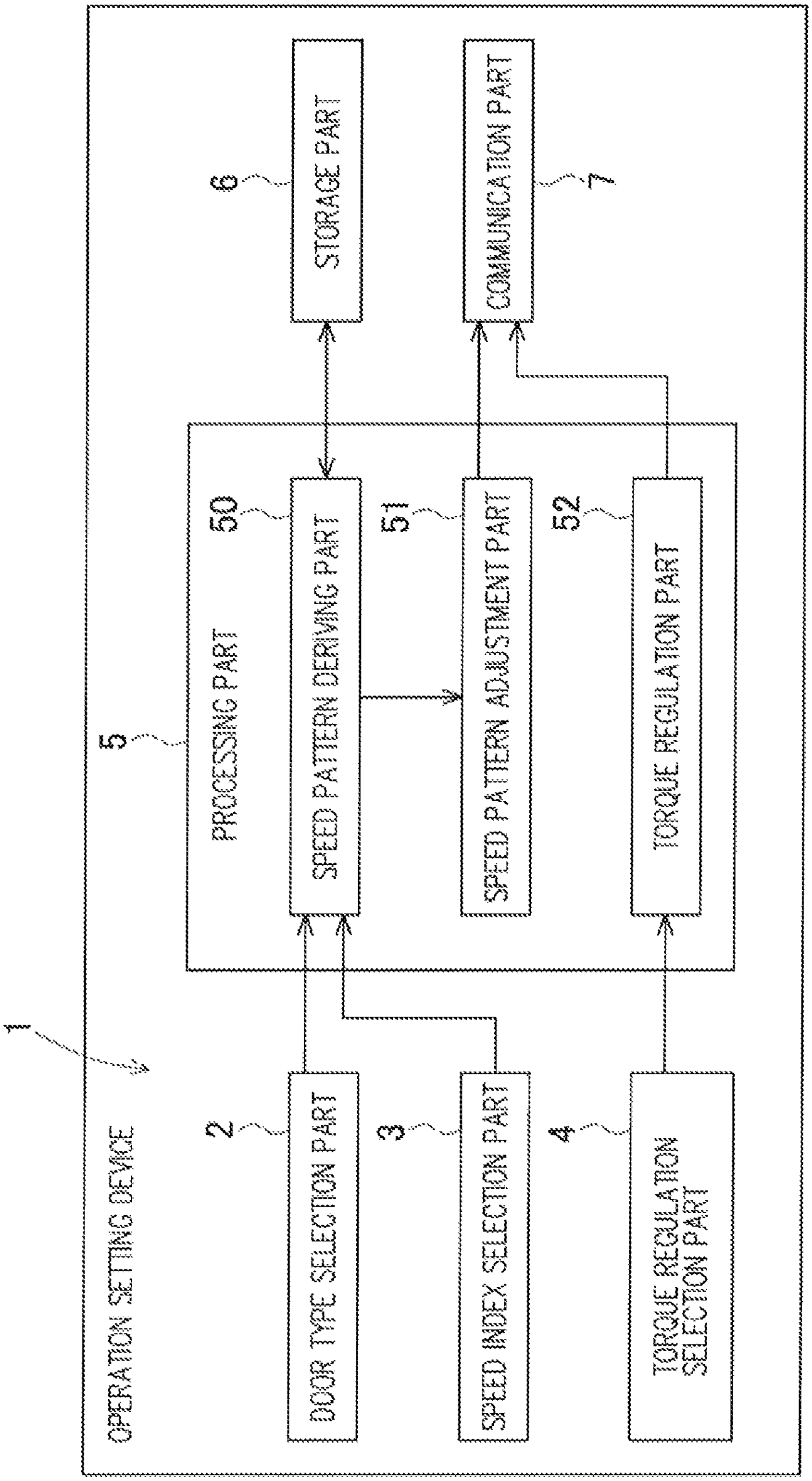
FIG. 3 is a block diagram showing an outline of a configuration of the operation setting device for the elevator door device according to the one embodiment.

The operation setting device 1 of this embodiment includes, as shown in FIG. 1, a door type selection part 2 in which a plurality of opening types of the car door D1 are set as options, speed index selection parts 3 in which a plurality of indexes representative of opening and closing speeds to be set on the car door D1 are respectively set as options, and a torque regulation selection part 4 that makes a selection on whether it is necessary to regulate the torque that can be produced by the motor, and further includes, as shown in FIG. 3, a processing part 5 that executes setting processing which includes deriving the operation setting information and outputting the same, a storage part 6 that stores the information, and a communication part 7 that connects the processing part 5 and the controller D3 in a mutually communicable manner.

The opening types of the car door D1 as the options to be selected by the door type selection part 2 are the types each determined for each combination of the number of door panels of the car door D1 and the direction in which the car door D1 slides in the opening operation.

The opening types of the car door D1 include, for example, the center open type in which the door panels of the car door D1 slide in mutually different directions in the opening operation, and the side open type in which the door panels of the car door D1 slide in the same direction in the opening operation. When the car door D1 has a single door panel, the opening type of the car door D1 is the side open type. The side open type is classified into different types respectively for the case in which the car door D1 slides toward one side in a width direction (right and left direction) of a car entrance in the opening operation and for the case in which the car door D1 slides toward the other side in the width direction.

In Table of FIG. 7, the numbers represent the number of door panels of the car door D1, and the alphabets represent the sliding directions of the car door D1. The “CO” represents the center open type, the “SR” represents the movement toward the right side in the side open type, and the "SL" represents the movement toward the left side in the side open type. Although FIG. 7 shows 5 different opening types, the number of the opening types are not necessarily limited.

The door type selection part 2 of this embodiment is constituted by one switch that is configured to select any one from among the plurality of opening types (options), (i.e., an opening type corresponding to the car door D1 on which the opening and closing operation is to be set), while bringing the other opening type(s) into a non-selectable state, and more specifically configured to output a signal representative of the selected opening type to the processing part. The door type selection part 2 of this embodiment is constituted by a rotary switch mounted to a casing C, as shown in FIG. 1, but may be constituted by, for example, a lever switch.

The index representative of the opening and closing speed to be selected by the speed index selection parts 3 is information representative of a target based on which the moving speed of the car door D1 is determined. In this embodiment, three indexes representative of high speed, medium speed, and low speed are set as the indexes representative of the opening and closing speeds. The speed index selection parts 3 are configured to enable selection of any one of these three indexes.

As shown in FIG. 1, the speed index selection parts 3 of this embodiment are constituted by a plurality of button switches respectively provided for indexes representative of opening and closing speeds. The plurality of button switches of the speed index selection parts 3 include three push buttons, namely a push button for selection of high speed, a push button for selection of medium speed, and a push button for selection of low speed, but the number of indexes selectable by the speed index selection parts 3 are not limited to three.

The plurality of button switches of the speed index selection parts 3 are mounted to the casing C, and each of them is configured to be switchable by being pressed between a selected state in which it selects an option allocated to itself, more specifically, a selected state in which it outputs, to the processing part, a signal representative of the fact that an option allocated to itself has been selected, and a non-selected state in which it does not output the signal.

The torque regulation selection part 4 is configured to be switchable (selectable), in the setting processing, between a state in which a function (process) for setting the regulation to the torque that can be produced by the motor is enabled, and a state in which the function (process) is disabled. The torque regulation selection part 4 is also constituted by a rotary switch mounted to the casing C in the same manner as the type selection part, but may be constituted by a lever switch, a button switch, or the like as long as it can make a selection on whether the function of setting the restriction to the output of the motor is enabled or disabled.

As shown in FIG. 3, the processing part 5 may be constituted by a computer that executes information processing according to the results of the selections (i.e., operation states) by the door type selection part 2, the speed index selection parts 3, and the torque regulation selection part 4. The processing part 5 of this embodiment is housed in the casing C.

The processing part 5 includes a speed pattern deriving part 50 that derives speed pattern information as the operation setting information on the basis of the opening type selected by the door type selection part 2 and the index representative of the opening and closing speed selected by the speed index selection parts 3 in the setting processing, a speed pattern adjustment part 51 that acquires, in the setting processing, entrance width information representative of a width of an entrance of the car door D1 and adjusts the speed pattern information derived by the speed pattern deriving part 50 to create adjusted pattern information, and a torque regulation part 52 that derives, in the setting processing, torque regulation information, based on which an upper limit of the torque is set as the torque that can be produced by the motor.

Figure 4:
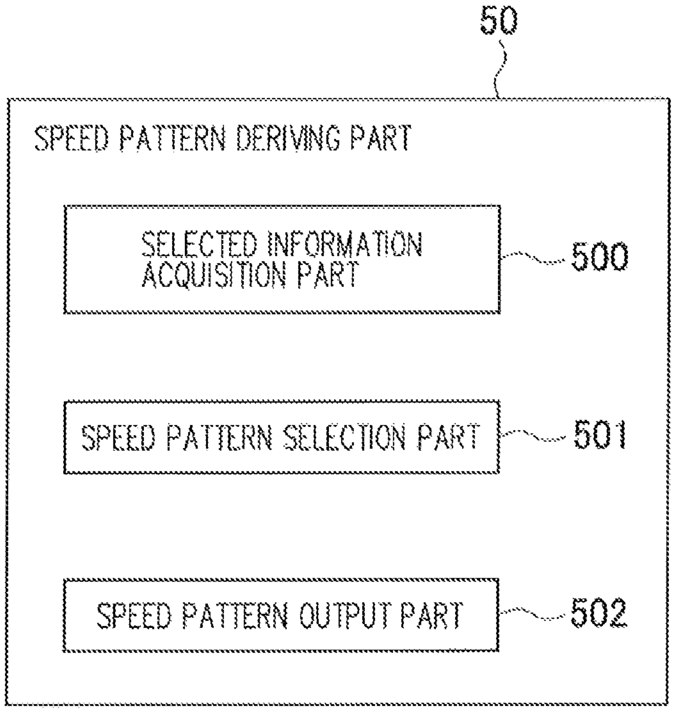
FIG. 4 is a block diagram showing a configuration of a speed pattern selection part of the operation setting device for the elevator door device according to the one embodiment.

As shown in FIG. 4, the speed pattern deriving part 50 includes a selected information acquisition part 500 that acquires selected type information representative of the opening type selected by the door type selection part 2 and selected index information representative of the index of the opening and closing speed selected by the speed index selection parts 3, a speed pattern selection part 501 that derives speed pattern information on the basis of the selected type information and the selected index information acquired by the selected information acquisition part 500, and a speed pattern output part 502 that outputs the speed pattern information derived by the speed pattern selection part 501.

The speed pattern information is herein prepared for each combination of the selected type information and the selected index information. The speed pattern information, and the combination of the selected type information and the selected index information may be stored in the storage part in association with each other by, for example, a table-type data structure as shown in FIG. 7.

Figure 8:
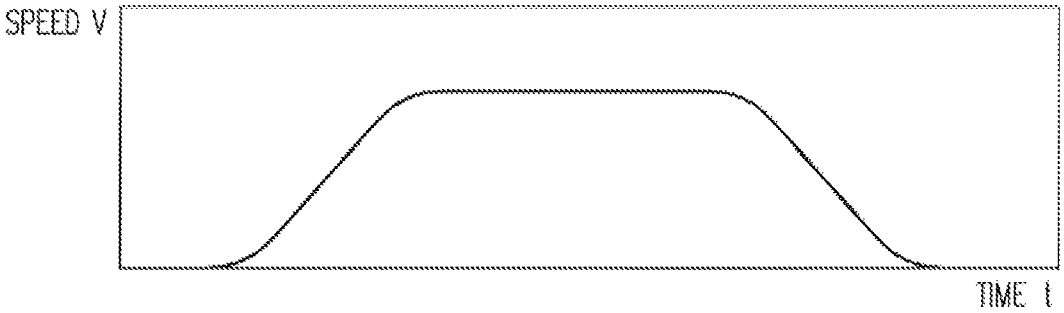
FIG. 8 is an explanatory diagram showing a data configuration of speed pattern information, opening and closing type information, and opening and closing speed information, of the operation setting device for the elevator door device according to the one embodiment.

As shown in FIG. 8, the speed pattern information includes information representative of the speed (sliding speed) of the car door D1 at each point of time when the car door D1 is made to slide. That is, in the speed pattern information, time information representative of each point of time during the sliding operation of the car door D1 and speed information representative of the sliding speed of the car door D1 are related with each other.

The controller D3 is configured to control the other elements such as the motor so as to slide the car door D1 at a speed represented by the speed pattern information.

The speed pattern selection part 501 is configured to select the speed pattern information which is associated with the combination of the selected type information and the selected index information. The speed pattern output part 502 is configured to output, to the storage part 6 (that is, write on the storage part 6), the speed pattern information selected by the speed pattern selection part 501.

Although not mentioned in the above embodiment, in a case in which the speed pattern information derived by the speed pattern output part 502 is not adjusted by the speed pattern adjustment part 51, the speed pattern output part 502 may directly output the speed pattern information to the communication part 7.

Figure 5:
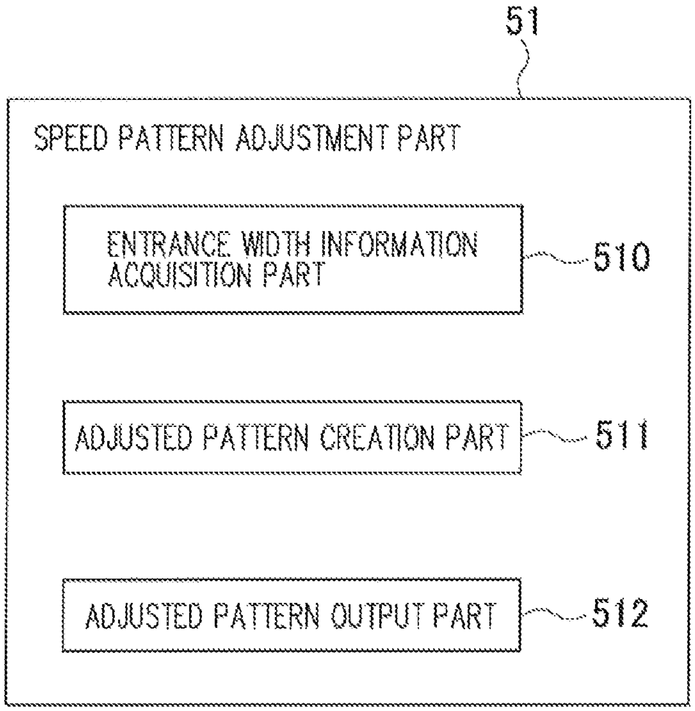
FIG. 5 is a block diagram showing a configuration of a speed pattern adjustment part of the operation setting device for the elevator door device according to the one embodiment.

As shown in FIG. 5, the speed pattern adjustment part 51 includes an entrance width information acquisition part 510 that acquires entrance width information representative of a width of an entrance of the car (specifically, a width of a space defining the entrance of the car door when the car door is in a full opened state), an adjusted pattern creation part 511 that changes information that is set in the speed pattern information on the basis of the entrance width information acquired by the entrance width information acquisition part 510 (more specifically, that is set in the speed pattern information derived by the speed pattern output part 502) to thereby create adjusted pattern information, and an adjusted pattern output part 512 that outputs the adjusted pattern information created by the adjusted pattern creation part 511.

The entrance width information acquisition part 510 is configured to cause the door device D to perform the opening and closing operation, acquire information (e.g., encoder pulses) related to the movement of the door device D, and derive the entrance width information on the basis of the information related to the movement of the door device D. The information related to the movement of the door device D includes, for example, the moving speed of the car door D1, and the time required from the start to the end of the opening and closing operation of the car door D1.

The adjusted pattern creation part 511 is configured to make a comparison between the entrance width information and reference entrance width information representative of the width of the entrance of the car serving as a reference when the speed pattern information has been created, and change the speed pattern information when the entrance width information is different from the reference entrance width information, so that it is possible to prevent occurrence of a trouble in a sliding movement of the car door D1 due to the difference between the width of the entrance of the car serving as a reference when the speed pattern information has been created, and the width of the entrance of the car equipped with the door device D on which the opening and closing operation is set. The reference entrance width information may be associated with each of the speed patterns.

The adjusted pattern creation part 511 may be configured to change the speed pattern information to increase the operation speed of the car door D1 when the width of the entrance represented by the entrance width information is larger than the width of the entrance represented by the reference entrance width information, and change the speed pattern information to decrease the operation speed of the car door D1 when the width of the entrance represented by the entrance width information is smaller than the width of the entrance represented by the reference entrance width information. The adjusted pattern creation part 511 may be configured to change the speed information, the time information, or the like of the speed pattern information in order to change the operation speed of the car door D1.

The adjusted pattern output part 512 is configured to output the adjusted pattern information created by the adjusted pattern creation part 511 to the communication part 7, but may be configured to output the adjusted pattern information to the storage part 6 or write the same on the storage part 6 as needed.

Figure 6:
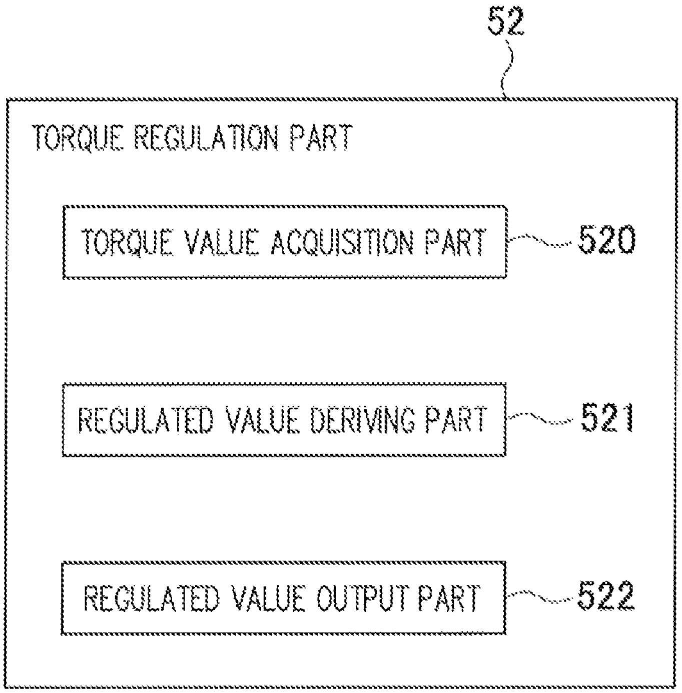
FIG. 6 is a block diagram showing a configuration of a torque regulation part of the operating setting device for the elevator door device according to the one embodiment.

As shown in FIG. 6, the torque regulation part 52 includes a torque value acquisition part 520 that acquires torque value information representative of a torque value of the motor of the door device D, a regulated value deriving part 521 that derives torque regulated value information that regulates the torque value of the motor or sets the same as an upper limit on the basis of the torque value information acquired by the torque value acquisition part 520, and a regulated value output part 522 that outputs the torque regulated value information derived by the regulated value deriving part 521.

The torque value acquisition part 520 may be configured to derive the torque value information by, for example, driving the motor and acquiring information related to the movement of the motor (e.g., a torque command value output to the motor), or read out the torque value information previously stored in the storage part 6 or the like.

The regulated value deriving part 521 is configured to designate the torque value, which results from increasing the torque value represented by the torque value information, as the regulated value information. The regulated value deriving part 521 may be configured to add a certain value to the torque value represented by the torque value information, or may be configured to add a value at a certain ratio to the torque value represented by the torque value information.

The regulated value deriving part 521 of this embodiment is configured to set a higher value to be added to the torque value represented by the torque value information as the index of the opening and closing speed selected by the speed index selection parts 3 represents a higher speed.

The regulated value output part 522 is configured to output the regulated value information derived by the regulated value deriving part 521 to the communication part 7. The regulated value output part 522 may be also configured to output the regulated value information to the storage part 6 or write the same on the storage part 6 as needed in the same manner as the adjusted pattern output part 512.

The processing part 5 and the storage part of the operation setting device 1 of this embodiment are housed in the casing C, but, for example, the storage part 6 may be disposed outside the casing C, as long as the processing part 5 can execute writing of the information on the storage part 6 and reading out the information stored in the storage part 6.

The communication part 7 may be configured to perform wired communication or wireless communication, as long as intercommunication with the controller D3 is enabled. The communication part 7 may be configured to directly communicate with the controller D3, or indirectly communicate with the same. As shown in FIG. 1, the communication part 7 of this embodiment is configured to be connected by wire and communicate with the controller D3 via an operation panel B of the car door D1.

The operation setting device 1 of this embodiment is configured as described above. Now, the description will be made for the method for setting the opening and closing operation of the door device D using the operation setting device 1.

The method for setting the opening and closing operation of the door device D of this embodiment includes a moving step of moving the car to a landing floor suitable for an operator to set the opening and closing operation, and a setting processing execution step of executing setting processing by operating the operation setting device 1.

In the moving step, the car, on which the opening and closing operation is set, is moved to a landing floor equipped with a heaviest landing door.

In the setting processing execution step, the opening and closing speed of the car door D1 is set, and setting is made to regulate the torque that can be produced by the motor.

When the opening and closing speed of the car door D1 is set in the setting processing execution step, the door type selection part 2 selects the opening type of the car door D1 of the door device D on which the setting is made; the speed index selection parts 3 selects the index of the opening and closing speed that serves as a target of the operation speed to be set on the car door D1; and while the speed index selection parts 3 are kept in the selecting state, the operation setting device 1 executes the setting processing. In the operation setting device 1 of this embodiment, the setting processing is started by pressing any of the speed index selection parts 3, and the processing for setting the opening and closing speed of the car door D1 is executed.

When the setting processing is started, the speed pattern deriving part 50 derives the speed pattern information on the basis of the opening type selected by the door type selection part 2, and the index of the opening and closing speed selected by the speed index selection parts 3.

More specifically, the selected information acquisition part 500 acquires the selected type information representative of the opening type selected by the door type selection part 2 and the selected index information representative of the index of the opening and closing speed selected by the speed index selection part 3, and the speed pattern selection part 501 derives the speed pattern information on the basis of the selected type information and the selected index information acquired by the selected information acquisition part 500.

The speed pattern information derived by the speed pattern selection part 501 is output to the storage part 6.

Subsequently, the speed pattern adjustment part 51 adjusts the speed pattern information derived by the speed pattern deriving part 50, and creates the adjusted pattern information.

More specifically, the entrance width information acquisition part 510 acquires the entrance width information representative of the width of the entrance of the door device D, and the adjusted pattern creation part 511 makes a comparison between the entrance width information and the reference entrance width information serving as a reference when the speed pattern information has been created so that, when it is judged that the entrance width information is different from the reference entrance width information, the speed information, the time information or the like set in the speed pattern information is adjusted on the basis of the entrance width information acquired by the entrance width information acquisition part 510 to thereby create the adjusted pattern information.

The adjusted pattern information created by the adjusted pattern creation part 511 is output to the communication part 7 by the adjusted pattern output part 512.

The adjusted pattern creation part 511 makes a comparison between the entrance width information and the reference entrance width information serving as a reference when the speed pattern information has been created, and, when it is judged that the entrance width information is the same as the reference entrance width information, the adjusted pattern output part 512 outputs the non-adjusted speed pattern information to the communication part 7.

The communication part outputs the adjusted pattern information or the speed pattern information to the controller 3 to set the behaviors of the opening operation and the closing operation of the car door D1.

Next, when the setting is made to regulate the torque that can be produced by the motor in the setting processing execution step, the processing is executed as the setting processing to regulate the torque that can be produced by the motor on the basis of the torque regulation information, while the torque regulation selection part 4 keeps selecting a mode in which the setting to regulate the torque that can be produced by the motor is requested. The processing to regulate the torque that can be produced by the motor can be executed by pressing again the speed index selection part 3 pressed at the time of executing the processing to set the opening and closing speed of the car door D1.

In the processing to regulate the torque that can be produced by the motor, the torque value acquisition part 520 acquires the torque value information representative of the torque value of the motor of the door device D, and the regulated value deriving part 521 derives the torque regulated value information that regulates the torque value of the motor or sets the same as an upper limit on the basis of the torque value information acquired by the torque value acquisition part 520.

The torque regulated information derived by the torque value acquisition part 520 is output to the controller D3 by the regulated value output part 522, and thereby, behaviors to stop the car door D1 in the course of the opening operation and the closing operation of the car door D1 are set.

As described above, according to the operation setting device 1 of this embodiment, the opening type of the car door D1 is selected by the door type selection part 2, and the index of the opening and closing speed of the car door D1 is selected by the door type selection part 2, so that the default speed pattern information is derived on the basis of the selected type of the opening and closing operation and the selected index of the opening and closing speed. Thus, in the case in which the opening type and the index of the opening and closing speed of the car door D1 as the conditions determining the setting content of the opening and closing operation are the same, the same content can be applied to those setting contents of the opening and closing operation.

The operation setting device 1 and the method for setting the opening and closing operation of the door device D using the operation setting device 1 can produce an excellent effect in which consistency can be secured in the setting contents of the opening and closing operation of the elevator door device.

Even in the case in which the speed pattern information is required to be adjusted according to the width of the entrance of the car door D1, the operation setting device, in which the processing part 5 adjusts the speed pattern information derived by the speed pattern deriving part 50 on the basis of the entrance width information, can prevent occurrence of a problem in behaviors of the door device D due to the difference between the width of the entrance serving as a reference when the speed pattern information has been created, and the width of the entrance of the door device D on which the opening and closing operation is set, and can apply the consistent manner of adjustment to the speed pattern information.

Further, even in the case in which the torque regulation selection part 4 is required to regulate the torque that can be produced by the motor, the torque regulation part 52, which is configured to derive the torque regulation information on the basis of the torque value information of the motor, can apply the consistent manner of torque regulation to the motor.

The car, on which the opening and closing operation is set, is moved to a landing floor equipped with a heaviest landing door before the setting processing execution step is performed in the method for setting the opening and closing operation of the door device D. Thus, the setting processing execution step is performed with the car moved to the landing floor equipped with the heaviest landing door. This can prevent the opening and closing operation from becoming slower than a desired speed when the door device D is made to perform the opening and closing operation at a landing floor different from the landing floor where the opening and closing operation has been set.

The operation setting device for the elevator door device of the present invention is not limited to the aforementioned embodiments, and it is a matter of course that various modifications can be made without departing from the gist of the present invention. For example, the configuration of a particular embodiment can be added to the configuration of another embodiment, and a part of the configuration of a particular embodiment can be replaced with the configuration of another embodiment. In addition, a part of the configuration of a particular embodiment can be eliminated.

In the above embodiment, the door type selection part 2 is constituted by one switch, but the present invention is not limited to this configuration. For example, the door type selection part 2 may be constituted by a plurality of button switches respectively provided for a plurality of options. In this case, each of the button switches may be configured to be switchable between a selected state in which it selects an option allocated to itself, more specifically, a selected state in which it outputs, to the processing part, a signal representative of the fact that an option allocated to itself has been selected, and a non-selected state in which it does not output the signal.

In the above embodiment, the speed index selection part 3 is constituted by the plurality of button switches respectively provided for the plurality of options, but the present invention is not limited to this configuration. For example, the speed index selection part 3 may be constituted by a single switch that is configured to enable selection of one of the plurality of options while bringing the remaining options into a non-selected state. In this case, the single switch constituting the speed index selection part 3 may be constituted by, for example, a rotary switch or a lever switch mounted to the casing C. In the case in which the speed index selection part 3 is constituted by a single switch, an operation part for executing setting processing must be provided.

In the above embodiment, the entrance width information acquisition part 510 is configured to derive the entrance width information on the basis of the information related to the movement of the door device D in the opening and closing operation, but the present invention is not limited to this configuration. For example, the entrance width information acquisition part 510 may be configured to read out the entrance width information which is exclusively designed for the door device D and stored in the storage part.

What is claimed is:

1. An operation setting device for an elevator door device, the operation setting device being configured to be temporarily connected to a controller for controlling the elevator door device, and comprising:

a door type selection part in which a plurality of opening types of a car door are set, the door type selection part being configured to enable selection of a desired type from among the plurality of opening types of the car door;

a speed index selection part in which a plurality of indexes respectively representative of different opening and closing speeds to be set for the car door are set, the speed index selection part being configured to enable selection of a desired index from among the plurality of indexes; and a processing part being configured to execute setting processing on the basis of the opening type selected by the door type selection part and the index of the opening and closing speed selected by the speed index selection part, the setting processing comprising deriving operation setting information representative of a setting content related to an opening and closing operation of the door device, and outputting the operation setting information to the controller that controls the opening and closing operation of the door device, the processing part comprising a speed pattern deriving part that derives speed pattern information in the setting processing on the basis of the opening type selected by the door type selection part and the index of the opening and closing speed selected by the speed index selection part, in which the speed pattern information is the operation setting information and represents the speed of the car door at each of time during the opening and closing operation of the door device.

2. The operation setting device for the elevator door device according to claim 1, wherein the processing part comprises a speed pattern adjustment part that, in the setting processing, acquires entrance width information representative of a width of an entrance of the car, and adjusts the speed pattern information derived by the speed pattern deriving part on the basis of the entrance width information to create adjusted pattern information.

3. The operating setting device for the elevator door device according to claim 1, wherein the processing part comprises a torque regulation part that derives, in the setting processing, torque regulation information that regulates a torque that can be produced by a motor serving as a power source of the car door, the torque regulation part being configured to acquire torque value information representative of a torque value of the motor, and allocating a torque value, which is higher than the torque value represented by the torque value information, as the torque regulation information.

4. A method for setting an opening and closing operation of a door device in a state in which the operation setting device for the elevator door device according to claim 1 is temporarily connected to the controller, the method comprising a setting processing execution step of allowing an operator to select the opening type corresponding to the car door of the door device as an object, in which the opening and closing operation is set, using the door type selection part, and to select the index of the opening and closing speed, which serves as a target of the moving speed of the car door of the door device as the object, in which the opening and closing operation is set, using the speed index selection part, and thereafter causing the processing part to execute the setting processing.

5. The operating setting device for the elevator door device according to claim 2, wherein the processing part comprises a torque regulation part that derives, in the setting processing, torque regulation information that regulates a torque that can be produced by a motor serving as a power source of the car door, the torque regulation part being configured to acquire torque value information representative of a torque value of the motor, and allocating a torque value, which is higher than the torque value represented by the torque value information, as the torque regulation information.

6. A method for setting an opening and closing operation of a door device in a state in which the operation setting device for the elevator door device according to claim 5 is temporarily connected to the controller, the method comprising a setting processing execution step of allowing an operator to select the opening type corresponding to the car door of the door device as an object, in which the opening and closing operation is set, using the door type selection part, and to select the index of the opening and closing speed, which serves as a target of the moving speed of the car door of the door device as the object, in which the opening and closing operation is set, using the speed index selection part, and thereafter causing the processing part to execute the setting processing.

7. A method for setting an opening and closing operation of a door device in a state in which the operation setting device for the elevator door device according to claim 2 is temporarily connected to the controller, the method comprising a setting processing execution step of allowing an operator to select the opening type corresponding to the car door of the door device as an object, in which the opening and closing operation is set, using the door type selection part, and to select the index of the opening and closing speed, which serves as a target of the moving speed of the car door of the door device as the object, in which the opening and closing operation is set, using the speed index selection part, and thereafter causing the processing part to execute the setting processing.

8. A method for setting an opening and closing operation of a door device in a state in which the operation setting device for the elevator door device according to claim 3 is temporarily connected to the controller, the method comprising a setting processing execution step of allowing an operator to select the opening type corresponding to the car door of the door device as an object, in which the opening and closing operation is set, using the door type selection part, and to select the index of the opening and closing speed, which serves as a target of the moving speed of the car door of the door device as the object, in which the opening and closing operation is set, using the speed index selection part, and thereafter causing the processing part to execute the setting processing.

* * * * *